Figure 1:
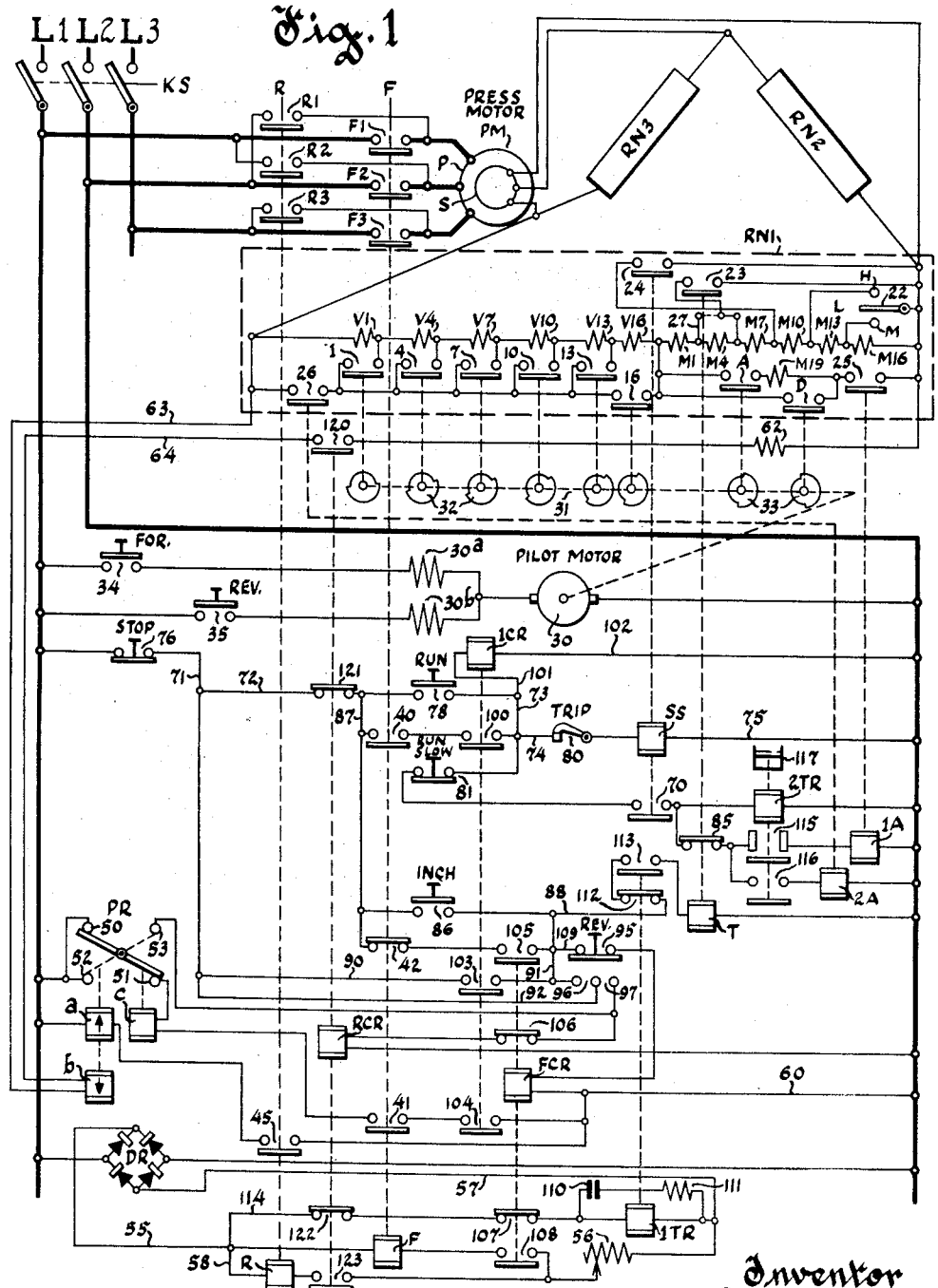

Fig. 2

RESISTANCE COMMUTATION TABLE

| STEP NO. | VERNIER RESISTOR CONTACTS | | MAIN RESISTOR CONTACTS | | SPEED POINTS |
|---|---|---|---|---|---|
| | OPEN | CLOSE | OPEN | CLOSE | |
| 1 | ALL | | ALL | | |
| 2 | | 1 | | | 1 |
| 3 | | 2 | | | 2 |
| 4 | | 3 | | | 3 |
| 5 | | 4 | | | 4 |
| 6 | 1 | 5 | | | 5 |
| 7 | 2 | 6 | | | 6 |
| 8 | 3 | 7 | | | 7 |
| 9 | 4 | 8 | | | 8 |
| 10 | 5 | 9 | | | 9 |
| 11 | 6 | 10 | | | 10 |
| 12 | 7 | 11 | | | 11 |
| 13 | 8 | 12 | | | 12 |
| 14 | 9 | 13 | | | 13 |
| 15 | 10 | 14 | | | 14 |
| 16 | 11 | 15 | | | 15 |
| 17 | 12 | 16 | | | 16 |
| 18 | 13 | 17 | | | 17 |
| 19 | 14 | 18 | | | 18 |
| 20 | 15 | | | | |
| 21 | 16 | | | A | 19 |
| 22 | 17 | | | B | 20 |
| 23 | 18 | | | C | 21 |
| 24 TO 42 | REPEAT STEPS 2 THRU 19 | | | | 22 TO 39 |
| 43 | 15 | | | | |
| 44 | 16 | | | D | 40 |
| 45 | 17 | | A | E | 41 |
| 46 | 18 | | B | F | 42 |
| 47 TO 64 | REPEAT STEPS 2 THRU 19 | | | | 43 TO 60 |

Inventor
Cyril P. Feldhausen
By H.R. Rather
Attorney

United States Patent Office 2,951,192
Patented Aug. 30, 1960

2,951,192

ELECTRIC MOTOR CONTROLLERS

Cyril P. Feldhausen, Wauwatosa, Wis., assignor to Cutler-Hammer, Inc., Milwaukee, Wis., a corporation of Delaware Filed May 24, 1956, Ser. No. 587,075

13 Claims. (Cl. 318—203)

This invention relates to improvements in electrical motor controllers.

While not limited thereto, the invention is especially applicable to controllers for graphic arts machinery such as printing presses and the like.

My Patent No. 2,409,264 granted October 15, 1946, and assigned to the assignee of the present application, discloses motor controllers having contactors for commutating motor secondary resistance to afford sixteen different pre-selectable operating speeds and for developing in the motor a high starting torque. The controllers of the aforementioned patent also employ apparatus for tripping the motor speed to a low value in response to abnormal condition and a plugging relay having a winding energized by the motor secondary winding to maintain plugging until the motor speed approaches zero.

It is often desirable to run a motor at a much greater number of preselectable operating speeds and to delay development of the high starting torque for an interval after energization of the motor. The latter is of great advantage because such delay affords take-up of backlash in the driven load at a low value of torque to obtain a more gradual start from rest position. It is also desirable to automatically limit the plugging current and torque to an adjustable predetermined value to reduce the severity of the plugging stop and to adjust the trip speed to a desired low value. The drop-out of plugging when the motor speed approaches zero must be controlled independently of the aforementioned adjustments.

Accordingly, a primary object of the invention is to provide improved means affording the aforementioned and other control functions.

A more specific object of the invention is to provide improved means for selectively and automatically decelerating the motor to different low speeds and reaccelerating to a preselected operating speed in incremental steps independently of the operating speed preselector to reduce the operating time and wear of the secondary resistance commutators.

A still more specific object of the invention is to provide improved means for connecting the plugging drop-out control winding of the plugging relay to a portion of the secondary resistance network to render its function independent of the low speed adjustments and variations in motor secondary frequency.

Other objects and advantages of the invention will hereinafter appear.

While the apparatus hereinafter described is effectively adapted to fulfill the objects stated, it is to be understood that I do not intend to confine my invention to the particular preferred embodiment of motor controller disclosed, inasmuch as it is susceptible of various modifications without departing from the scope of the appended claims.

In the accompanying drawings:

Figure 1 illustrates an electrical motor controller constructed in accordance with the present invention; and
Fig. 2 is a table indicating a preferred sequence for commutating the external secondary resistors of the motor shown in Fig. 1.

Referring to Fig. 1 there is shown a printing press motor PM having a three-phase primary winding P and a three-phase secondary winding S. Power to the motor primary winding is supplied from a power supply source (not shown) through supply lines L1, L2 and L3, a manually operable knife switch KS and contacts F1, F2 and F3 of an electromagnetic forward contactor F, or alternatively through contacts R1, R2 and R3 of an electromagnetic reverse contactor R. The aforementioned contactors control the conventional reversing connections for the motor primary winding and selective energization thereof affords forward and reverse operations of motor PM. Delta-connected secondary resistance networks RN1, RN2 and RN3 are connected across the three phases, respectively, of the secondary winding. The speed of the motor is controlled by suitable commutation of external resistance in varying amounts in each of the phases of the secondary winding to afford a multiplicity of speed points. Resistance networks RN2 and RN3 are identical to resistance network RN1 and, therefore, are schematically depicted for the sake of simplicity.

Each of the secondary resistance networks RN1, RN2 and RN3 comprises six vernier resistors, seven main resistors and associated commutating and accelerating contacts. More specifically, network RN1 comprises vernier resistors V1, V4, V7, V10, V13 and V16, associated commutating contacts 1, 4, 7, 10, 13 and 16 for shunting the respective vernier resistors, main resistors M1, M4, M7, M10, M13, M16 and M19 and associated commutating contacts A and D. Network RN1 also comprises a manually-operable double-throw switch 22 for adjusting the slow speed of motor PM, normally-open contacts 23 of a high starting-torque relay T, normally-open contacts 24 of a slow down trip relay SS, normally-open contacts 25 and 26 of accelerating relays 1A and 2A, respectively, for affording in combination with contacts 24 gradual acceleration of motor PM, and a two-position, fixed connector link 27 for adjusting the starting torque, all as hereinafter described.

Resistance networks RN2 and RN3 comprise like vernier resistors, main resistors and respectively associated commutating contacts. Referring to the table in Fig. 2, commutating contacts 2, 5, 8, etc., and 3, 6, 9, etc., are in networks RN2 and RN3, respectively. Commutating contacts A through F are similarly distributed in these resistance networks contacts B and E being in network RN2 and contacts C and F being in network RN3. Each resistance network RN2 and RN3 also has a slow speed adjusting switch similar to switch 22 of network RN1. In addition each network RN2 and RN3 has torque relay contacts, trip relay contacts and accelerating relay contacts similar to and simultaneously operable with their respectively corresponding contacts 23 through 26 in resistance network RN1 and an alternative connection similar to link 27 for adjusting the starting torque.

Connected across lines L1 and L2 is a pilot motor 30 mechanically coupled to a switch drum schematically depicted at 31, to drive the latter in reverse directions for commutating the speed-controlling vernier resistors and main resistors in the secondary resistance networks. Switch drum 31 is shown as having cams 32 for operating vernier contacts 1, 4, 7, 10, 13 and 16 and cams 33 for operating main contacts A and D in the secondary resistance network RN1. Although only the cams 32 and 33 which operate the resistance commutating contacts of network RN1 are schematically depicted, it is to be understood that in practice the drum would include two additional cams on the right-hand side of each of the cams shown for operating the corresponding vernier and main contacts of resistance networks RN2 and RN3. This switch drum is constructed and arranged to operate a single set of vernier contacts in each resistance network RN1, RN2 and RN3 in succession to constitute a vernier cycle. The main switch portion of the drum is constructed to interpose sequential operation of main contacts A, B and C between the first and second vernier cycles and main contacts D, E and F between the second and third vernier cycles to obtain sixty speed points. Reference should be made to United States Patent No. 2,672,579, issued to Theodore B. Jochem on March 16, 1954, for a more detailed description of the afore-described switch drum mechanism.

Pilot motor 30 is a split field alternating current motor having field windings 30$^a$ and 30$^b$ for forward and reverse operations, respectively. Motor 30 is supplied across one phase, lines L1—L2, of the three phase power supply source through a forward switch 34, or alternatively through a reverse switch 35. Switches 34 and 35 are shown as of the manually operable pushbutton type but, if desired, electromagnetic switches operated by a control circuit such as disclosed in United States Patent No. 2,708,259, issued to Cyril P. Feldhausen and Lawrence A. Ferk on May 10, 1955, may be used in place thereof. Also, if desired, a solenoid-engaged indexing wheel may be employed to accurately position the switch drum on each step and to prevent the latter from stopping between steps in the manner disclosed in the aforementioned Feldhausen and Ferk patent.

There is shown in the lower portion of Fig. 1 a control network whereby press motor PM can be controlled for forward inching and running, limited plugging for stopping, trouble slow down tripping followed by reacceleration, and for reverse operation. More specifically, the control network of Fig. 1 comprises forward contactor F which has normally-open contacts 40 and 41 and normally-closed contacts 42 in addition to contacts F1–3 in the motor primary circuit, reverse contactor R which has normally-open contacts 45 in addition to contacts R1–3 in the motor primary circuit, and a plugging relay PR having normally-closed contacts 50 and 51 and normally-open contacts 52 and 53 for controlling reverse energization of motor primary winding P in stopping. Contactors F and R are mechanically interlocked and their operating circuits are alternatively connectable across lines L1 and L2 through a rectifier bridge DR, conductor 55, a variable resistor 56 and conductor 57; the circuit of the coil of contactor R branching through conductor 58. Plugging relay PR is a double-throw type which is actuated to its full-line position by a differential coil comprising a winding $a$ opposed by a winding $b$. Winding $a$ is connectable across lines L1 and L2 through normally-open contacts 45 of contactor R and conductor 60 while winding $b$ is series connected with resistor 62 across secondary resistance network RN1 through conductors 63 and 64. Connection of winding $b$ in parallel rather than in series with network RN1 is preferred to prevent significant variations in the drop-out of plugging relative to motor speed when the slow speed is adjusted at contacts 22. The resistance of resistor 62 is preferably high relative to the inductance of winding $b$ so that the operating level of the latter will not be affected by a change in secondary frequency. Relay PR also has a coil $c$ for actuating the former to its dotted-line position.

Fig. 1 also includes the aforementioned accelerating and trip relay SS having normally-open contacts 70 for controlling a timing relay 2TR in addition to trip contacts 24 in each resistance network RN1–3, and the aforementioned accelerating relays 1A and 2A for operating the aforementioned contacts 25 and 26, respectively, in each resistance network RN1–3. The operating coil of relay SS is connectable across lines L1 and L2 through conductors 71, 72, 73, 74 and 75, this connection also including a Stop switch having normally-closed contacts 76, a Run switch having normally-open contacts 78 and a Trip switch having normally-closed contacts 80. A Run Slow switch having normally-closed contacts 81 is connected in the circuits of the operating coils of relays 2TR, 1A and 2A. The Run switch and Run Slow switch are shown as separate switches of the pushbutton type but, if desired, a well known unitary switch having contacts such as 78 and 81 and a pushbutton surrounded by a rotatable sleeve may be used in place thereof. Such unitary switch would be so constructed and arranged that contacts 78 would close and contacts 81 would open when the pushbutton is pressed and return to their normal positions when the pushbutton is released. Rotation of the sleeve would operate only contacts 81 through the interposition of a cam actuator to open the same to interrupt the circuits of the operating coils of timing relay 2TR and accelerating relays 1A and 2A. Fig. 1 further includes the aforementioned torque relay T having normally-closed contacts 85 in the energizing circuit of relays 1A and 2A in addition to its high starting-torque contacts 23 in each of the resistance networks RN1–3. The operating coil of relay T is connectable across lines L1 and L2 through an Inch switch having normally-open contacts 86 in series with conductors 71, 72, 87 and 88 or through conductors 71, 90, 91 and 88, or through a third circuit including conductors 71, 92, 91 and 88. The latter circuit includes a Reverse switch having normally-closed contacts 95 and normally-open contacts 96 and 97 for initiating reverse operation of press motor PM.

In addition Fig. 1 includes a plurality of relays through the medium of which the aforementioned contactors and relays are controlled. These relays include a relay 1CR having normally-open contacts 100 in a holding circuit for its operating coil and that of relay SS through "stop" switch 76, conductors 71, 72 and 87, contacts 40 and 100 where it divides. One branch continues through conductors 73 and 101, coil of relay 1CR and conductor 102 while the other branch continues through conductor 74, Trip switch contacts 80, coil of relay SS and conductor 75. Relay 1CR also has normally-open contacts 103 in one of the aforementioned energizing circuits of relay T and of relay FCR, and normally-open contacts 104 in the operating circuit of coil $c$ of relay PR. Relay FCR has normally-open contacts 105 in the holding circuit for its operating coil shunting the Inch switch, normally-closed contacts 106 for preventing operation of the reverse control relay RCR in forward operation, normally-closed contacts 107 in an operating circuit for relay 1TR and normally-open contacts 108 for controlling the operation of contactor F. The operating coil of relay FCR is connectable across lines L1 and L2 in a circuit including "stop" switch contacts 76, conductors 71 and 90, contacts 103, conductors 91 and 109, contacts 95 and conductor 60. A first timing relay 1TR has a timing circuit comprising a capacitor 110 and resistor 111 series connected across its operating coil for sequential operation of its contacts 112 and 113 to energize relay T for a predetermined period of time. It may be assumed that these contacts are so constructed and arranged that contacts 113 open approximately two seconds after contacts 112 close. The operating coil of relay 1TR is energized through conductors 55 and 114, contacts 122 and 107 and conductor 57. A second timing relay 2TR has normally-open contacts 115 and 116 for controlling energization of the operating coils of relays 1A and 2A. Relay 2TR is a conventional relay of the pneumatic type having a dashpot 117 which may be assumed to be constructed so that contacts 115 close approximately two seconds and contacts 116 approximately four seconds after energization of its operating coil. A reverse control relay RCR has normally-open contacts 120 for activating winding $b$ of plugging relay PR, normally-closed contacts 121 for disconnecting the forward contactor and accelerating relays, normally-closed contacts 122 for operating timing relay 1TR, and normally-open contacts 123 for operating reverse contactor R.

One or more mechanically operable Trip switches, such as switch 80, are preferably series connected with the operating coil of relay SS to trip motor PM to a reduced speed under abnormal trouble or limit conditions occurring at one or more parts of the press. Closure of Inch switch contacts 86 initiates operation of the press at a low "Inching" speed, closure of Run switch contacts 78 initiates running of the press and closure of Run Slow switch contacts 81 initiates acceleration thereof to a desired forward speed, opening of Stop switch contacts 76 controls stopping and plugging and operation of the Reverse switch to close contacts 96 and 97 controls operation of driven motor PM in a reverse direction, all as hereinafter described. Variable resistor 56 affords adjustment of the energization level of contactors F and R in the event rectifiers in bridge DR change in value.

The table in Fig. 2 shows the order of commutation of normally-open vernier contacts 1 through 18 and main contacts A through F. It will be noted that 64 steps of the switch drum afford 60 speed points in going from a condition of maximum motor secondary resistance to a condition of zero external secondary resistance and vice versa. The repeated commutation of vernier contacts 1 through 18 in accelerating from step 2 to 19, step 24 to 42 and step 47 to 64 affords a significant saving in the number of resistors, contacts and wiring required. The values of these resistors are suitably selected so that the change in speed of motor PM from a given speed point to higher or lower speed points will be substantially linear. Vernier contacts 1 through 18 are operated in numerical order. Vernier contacts 1 are opened one step after contacts 4 are closed to avoid reinsertion of resistor V1 which would occur for an instant were these contacts operated simultaneously. Although steps 20 and 43 produce no change in the motor speed, they are provided to afford orderly commutation of the vernier contacts. On step 21 contacts 16 open to reinsert all of the vernier resistance in network RN1 while contacts A close to reduce the main resistance in series with the vernier section. The actual result is a one-step linear decrease in the total resistance of the circuit although the vernier section has been reinserted. A similar action then occurs in networks RN2 and RN3 at steps 22 and 23, respectively, to place the drum in a position corresponding to step 1 except that contacts A, B and C are closed. The vernier section is then commutated as before to obtain 18 more speed points. On step 44 a one-step linear decrease in resistance is repeated by opening contacts 16 and closing contacts D in network RN1 followed by a similar action in networks RN2 and RN3 at steps 45 and 46, respectively. The vernier section is then commutated a third time for 18 more speed points affording a total of 60 speed points.

Considering the operation of the motor controller, let it be assumed that power supply lines L1, L2 and L3 are energized from a three-phase power supply source (not shown) and that the parts are in the positions shown in Fig. 1. Upon closure of knife switch KS in lines L1, L2 and L3 rectified alternating current is supplied to the winding of slow release timing relay 1TR from line L1 through rectifier bridge DR, conductors 55 and 114, contacts 122 and 107, the operating coil of relay 1TR, conductor 57, rectifier bridge DR to line L2. Relay 1TR thus operates to open its contacts 112 and close contacts 113. Capacitor 110 connected across the operating coil of relay 1TR charges in this circuit through resistor 111. The system is now in its "Ready" condition. Starting of driven motor PM is controlled by operation of the Inch switch, the Run and Run Slow switches or the Reverse switch.

To operate press motor PM at a low speed in the forward direction, the Inch switch is pressed to close contacts 86 to establish an energizing circuit for relay FCR across lines L1 and L2. This circuit may be traced from line L1 through Stop switch contacts 76, conductors 71 and 72, contacts 121, conductor 87, the then closed Inch switch contacts 86, conductor 109, Reverse switch contacts 95, the operating coil of relay FCR and conductor 60 to line L2. Relay FCR is energized to close its contacts 105 to provide a holding circuit through contacts 42 for its operating coil shunting Inch switch contacts 86 so that if the Inch switch contacts are opened momentarily, relay FCR is not deenergized. Relay FCR opens its contacts 106 to prevent energization of the operating coil of reverse control relay RCR, opens the circuit of the operating coil of relay 1TR at contacts 107 to initiate release of the latter, and closes its contacts 108 to complete an energizing circuit for the operating coil of forward contactor F. The operating coil of contactor F is energized through a circuit across rectifier bridge DR comprising conductor 55, operating coil of contactor F, the then closed contacts 108, variable resistor 56 and conductor 57. Contactor F closes its contacts F1, F2 and F3 to connect the power supply source (not shown) through lines L1, L2 and L3 and knife switch KS to the primary winding P of motor PM. Due to the timed release characteristics of relay 1TR, afforded by the time delay circuit comprising capacitor 110 and resistor 111 connected thereacross, this relay does not release and close its contacts 112 at the instant when primary winding P is initially energized. Thus, motor PM attempets to start in the forward direction with all the resistors of networks RN1–3 in circuit with secondary winding S. This function is desirable to provide backlash take-up in the driven machinery before a high torque is developed so that the take-off from rest is more gradual.

Upon the opening of contacts 107 as hereinbefore described, capacitor 110 starts to discharge through resistor 111 and the operating coil of relay 1TR. The timing of relay 1TR is preset so that its contacts 112 close approximately two seconds after the Inch switch is closed to provide sufficient delay to afford the above-mentioned blacklash take-up. After another two seconds contacts 113 of relay 1TR open. Upon the closure of contacts 112 and while contacts 113 remain closed, the operating coil of torque relay T is energized to close its contacts 23 thereby to effectively shunt main resistors M7, M10, M13 and M16 in secondary network RN1 and the corresponding resistors in networks RN2 and RN3 out of circuit to afford delayed high torque starting. The energizing circuit for the operating coil of relay T may be traced from line L1 through Stop switch contacts 76, conductors 71 and 72, contacts 121, conductor 87, Inch switch contacts 86, conductor 88, contacts 112 and 113, and the operating coil of relay T to line L2. Contacts 85 of relay T are opened, but they are ineffective at this time. When contacts 113 open, the operating coil of relay T is deenergized to effectively reconnect, through opening of its contacts 23, the aforementioned main resistors in circuit in each phase of secondary winding S.

Upon the energization of the operating coil of forward contactor F as hereinbefore described, its contacts 40 and 41 close but perform no useful function at this time and its contacts 42 open to interrupt the holding circuit for the operating coil of relay FCR. Therefore, in order to maintain rotation of the motor at a low "inching" speed in the forward direction, it is necessary to maintain Inch switch contacts 86 closed. So long as Inch switch contacts 86 are maintained closed, motor PM runs forward at a slow speed determined by the value of resistance in the secondary networks and the load. When the Inch switch is released to permit contacts 86 to open, relay FCR deenergizes to open the energizing circuit for contactor F at contacts 108 and to again complete the energizing circuit for relay 1TR through contacts 107 to energize the latter. Release of contactor F opens its contacts F1–3 to interrupt energization of the primary circuit of motor PM.

To operate press motor PM at a predetermined and controlled rate of speed in the "forward" direction and to obtain gradual acceleration to such speed, pilot motor 30 is operated to position drum 31 at a desired one of the sixty speed points afforded by the latter. Let it be assumed that switch drum 31 is in position I and "Forward" switch 34 is closed to energize "forward" field winding 30a across conductors L1 and L2 to run pilot motor 30 in the forward direction until a desired speed point is reached. Pilot motor 30 rotates drum 31 wherein cams 32 and 33 actuate vernier contacts 1 through 18 and main contacts A through F in accordance with the table shown in Fig. 2. When the desired speed point is reached, forward switch 34 is opened to stop the pilot motor. Let it be assumed that switch drum 31 is stopped at step No. 43 so that vernier contacts 16, 17 and 18 and main contacts, A, B and C are closed while the remaining commutating contacts are open.

The Run and Run Slow switches are simultaneously pressed to close contacts 78 and open contacts 81. Closure of contacts 78 establishes an energizing circuit for relays 1CR and SS. This circuit may be traced from line L1 through Stop switch contacts 76, conductors 71 and 72, contacts 121, and Run switch contacts 78 where it divides. One branch continues through conductor 101, the operating coil of relay 1CR and conductor 102 to line L2 while the other branch continues through conductors 73 and 74, Trip switch contacts 80, the operating coil of relay SS and conductor 75 to line L2. Run Slow switch contacts 81 are simultaneously opened to prevent energization of timing relay 2TR at this time. The operating coil of relay 1CR is energized and closes its contacts 100 to prepare a holding circuit for itself and the operating coil of relay SS shunting Run switch contacts 78 to be completed upon subsequent energization of the operating coil of contactor F. Closure of contacts 103 of relay 1CR completes an energizing circuit for the operating coil of relay FCR across lines L1 and L2 through Stop switch contacts 76, conductors 71 and 90, contacts 103, conductors 91 and 109, Reverse switch contacts 95, the operating coil of relay FCR and conductor 60 to line L2. Closure of contacts 104 of relay 1CR prepares a circuit for coil c of plugging relay PR to be completed upon subsequent energization of contactor F. The operating coil of relay SS is energized in the above-described circuit and closure of its contacts 24 in each of the resistance networks effectively shunts main resistors M10, M13 and M16 and corresponding resistors in networks RN2 and RN3 out of circuit. Relay SS closes its contacts 70 to prepare a circuit for relay 2TR to be completed upon subsequent closure of contacts 81.

The operating coil of relay FCR is energized in the above-traced circuit and closes its contacts 105 to complete a momentary holding circuit for itself shunting contacts 103, opens its contacts 106 to prevent operation of reverse control relay RCR, opens its contacts 107 to interrupt the energizing circuit of relay 1TR to initiate release of the latter, and closes its contacts 108 to complete an energizing circuit for the operating coil of "forward" contactor F across rectifier bridge DR as hereinbefore described in connection with the "inching" operation. Contactor F thereupon closes its contacts F1, F2 and F3 to connect the power supply source to the primary windings P of motor PM as heretofore described. Motor PM starts in the forward direction with a starting torque as determined by relay SS having shunted the aforementioned secondary resistors effectively out of circuit. Contactor F also closes its contacts 40 to complete the holding circuit for the operating coil of relays 1CR and SS through the then closed contacts 100 in parallel with Run switch contacts 78, opens its contacts 42 to perform no useful function at this time because contacts 103 of relay 1CR remain closed, and closes its contacts 41 to energize coil c of relay PR. The Run and Run Slow switches may then be released to open contacts 78 and close contacts 81 at any time after energization of contactor F without release of the then-operated relays, because relays 1CR and SS are held energized through the then closed contacts 40 which shunt Run switch contacts 78. The circuit of coil c is traced from line L1 through contacts 50 and 51 of relay PR, coil c, contacts 41 and 104 and conductor 60 to line L2. Coil c of relay PR being thus energized responds to shift relay PR to its dotted-line operating position which has no immediate effect except to deenergize coil c. Relay PR remains in its new position without dependence upon coil c. This prepares the control system for stopping operation utilizing plugging as hereinafter described. When the release of relay 1TR was initiated by the opening of contacts 107 of relay FCR, slow-release relay 1TR deenergizes at a timed rate to close its contacts 112 a few seconds after the Run switch contacts are closed to provide sufficient delay to afford the aforementioned backlash take-up. After two more seconds contacts 113 of relay 1TR open. Upon the closure of contacts 112 and while contacts 113 remain closed, the operating coil of torque relay T is energized for a period of approximately two seconds. The energizing circuit of relay T may be traced from line L1 through Stop contacts 76, conductors 71 and 90, contacts 103, conductors 91 and 88, contacts 112 and 113 and the operating coil of relay T to line L2. Relay T thus responds to close its contacts 23 in each of the secondary resistance networks to shunt resistor M7 in network RN1 and corresponding resistors in networks RN2 and RN3 effectively out of circuit. Thus a delayed higher starting torque is afforded motor PM. Due to the energization of relay T its contacts 85 are held open to prevent energization of accelerating relays 1A and 2A. Upon deenergization of relay T, in response to opening of contacts 113 and as relay 1TR times out as hereinbefore described, contacts 23 of the former open to reinsert the aforementioned resistors in the secondary networks and its contacts 85 close to prepare an energizing circuit for accelerating relays 1A and 2A.

Upon the release of the Run and Run Slow switches contacts 78 open and contacts 81 close. Contacts 81 establish an energizing circuit for the operating coil of slow-operating timing relay 2TR from line L1 through Stop switch contacts 76, conductors 71 and 72, contacts 121, conductors 87, contacts 40, 100, 81 and 70, the operating coil of relay 2TR to line L2. Relay 2TR closes its contacts 115 approximately two seconds and closes its contacts 116 approximately four seconds after energization of its operating coil. The operating coil of relays 1A and 2A are thus energized two seconds apart. These energizing circuits may be traced from line L1 through Stop switch contacts 76, conductors 71 and 72, contacts 121, conductor 87, contacts 40, 100, 81, 70 and 85 where it divides. One branch continues through contacts 115 and the operating coil of relay 1A to line L2, while the other branch continues through contacts 116 and the operating coil of relay 2A to line L2. Relays 1A and 2A thus being energized accelerate driven motor PM by shunting additional secondary resistors in succession through closure of their contacts 25 and 26, respectively. It was hereinbefore assumed that pilot motor 30 is operated to preset drum 31 on step 43 wherein vernier contacts 16, 17 and 18 and main contacts A, B and C are closed. Under these conditions, closure of contacts 25 of relay 1A reduces the secondary resistance by connecting resistor M19 in parallel with resistors M1, M4 and M7. Relay 1A also correspondingly reduces the resistance of networks RN2 and RN3. Motor PM accelerates to a speed determined by this intermediate step. In turn contacts 26 of relay 2A close to shunt all the vernier resistors in networks RN1, RN2 and RN3 to accelerate motor PM to the final preselected speed.

The Run Slow switch is constructed so that it may be latched in a position wherein contacts 81 are maintained open to prevent energization of relays 2TR, 1A and 2A. As will be seen in Fig. 1, under these conditions motor PM runs at a predetermined slow speed limited solely by closure of SS relay contacts 24 in each of the secondary resistance networks. Motor PM may be accelerated to its running speed preselected by drum 31 by returning the Run Slow switch to its normal position to close its contacts 81 to energize relay 2TR. Relay 2TR responds to energize relays 1A and 2A sequentially to accelerate the press motor in two incremental steps as hereinbefore described.

The speed of motor PM may now be changed to any of the sixty speed points afforded by drum 31 by closing either "forward" contacts 34 or "reverse" contacts 35. Closure of contacts 34 will act to operate pilot motor 30 and drum 31 in the forward direction to increase the speed by shunting more secondary resistance. Conversely, closure of contacts 35 will act to operate pilot motor 30 in the reverse direction to decrease the speed by reinserting secondary resistance.

In the event of trouble or other abnormal conditions, such as for example, a misfit sheet in the press or limit conditions, Trip switch contacts 80 automatically respond to deenergize the operating coil of relay SS to open its contacts 24 and 70. Opening of contacts 24 reinserts main resistor M10, M13 and M16 into secondary network RN1 and the corresponding resistors into networks RN2 and RN3. Opening of contacts 70 deenergizes the operating coil of relay 2TR which releases to open its contacts 115 and 116. The operating coils of relays 1A and 2A are consequently also deenergized to open their respective contacts 25 and 26 in each of the secondary networks. Thus all of the secondary resistance is reinserted to trip the motor speed to a low value without running switch drum 31 back to its step 1 position. The trip speed of motor PM is predetermined and controlled by the setting of switch 22 from low speed in the center position to medium to high at contacts M and H, respectively. When the trouble conditions are corrected and Trip switch contacts 80 are again closed, relay SS energizes followed by the timed energization of relays 2TR, 1A and 2A to reaccelerate the press in three steps at contacts 24, 25 and 26 to its former running speed predetermined by the setting of drum 31.

To stop the press, the Stop switch is pressed to open its contacts 76 to interrupt the energizing circuits of the parallel-connected operating coils of relays 1CR, SS, 2TR, 1A, 2A and FCR. Relay 1CR releases to open its contacts 103 at a further point in the circuit of relay FCR. Relays SS, 1A and 2A release to reinsert all of the secondary resistance regardless of drum position, as hereinbefore described, to reduce the severity of the plugging stop. Relay FCR releases to open its contacts 108 to interrupt the energizing circuit of the operating coil of forward contactor F and close its contacts 106 to complete an energizing circuit for the operating coil of relay RCR from line L1 through contacts 52 and 53 of plugging relay PR in its dotted-line position, contacts 106, the operating coil of relay RCR to line L2. Contactor F releases to interrupt the primary winding power connections to motor PM. Relay RCR opens its contacts 121 at a further point in the circuit of the above-mentioned parallel-connected relays. At this time the Stop switch could be released to close its contacts 76 without reoperating the press because contacts 121 and 103 are open. Relay RCR opens its contacts 122 to interrupt the energizing circuit of relay 1TR to prevent operation of the latter and opens its contacts 123 to complete an energizing circuit for the operating coil of reverse contactor R across rectifier bridge DR through conductors 55 and 58, the coil of contactor R, contacts 123, resistor 56 and conductor 57. Relay RCR also closes its contacts 120 to establish an energizing circuit for winding b of plugging relay PR across secondary resistance network RN1 through conductor 63, winding b, conductor 64, contacts 120 and resistor 62. Contactor R closes its contacts R1, R2 and R3 to complete reverse power connections to motor PM to expedite stopping of the press, and closes its contacts 45 to complete an energizing circuit for winding a of plugging relay PR. Windings a and b of plugging relay PR are differentially energized so that the magnetic flux introduced by winding b opposes that of winding a. When the forward speed of motor PM approaches zero with a consequent reduction in current flow through winding b, the magnetic force of winding a overcomes that of winding b to shift the contactor of plugging relay PR to the full-line position to deenergize relay RCR. Opening of contacts 123 of relay RCR releases reverse contactor R to permit motor PM to stop and energizes the operating coil of relay 1TR through closure of its contacts 122. The controller is thus restored to its "Ready" condition.

To operate motor PM in the reverse direction the Reverse switch is operated to open its contacts 95 and close its contacts 96 and 97. The operating coil of relay RCR is energized from line L1 through Stop switch contacts 76, conductor 71, conductor 92, contacts 97 and 106, the coil of relay RCR to line L2. Relay RCR closes its contacts 123 to complete an energizing circuit for reverse contactor R and opens its contacts 122 to initiate release of timing relay 1TR. Contacts R1, R2 and R3 of contactor R close to complete reverse power connections to the primary winding P of motor PM. When the release of timing relay 1TR was initiated by the opening of contacts 122 of relay RCR, the operating coil of relay 1TR is deenergized at a timed rate to close its contacts 112 approximately two seconds after the Reverse switch contacts 26 and 27 are closed to provide sufficient delay to afford the afore-mentioned backlash take-up. After two more seconds contacts 113 of relay 1TR open. Upon the closure of contacts 112 and while contacts 113 remain closed, the operating coil of torque relay T is energized for a period of approximately two seconds. The operating circuit of relay T may be traced from line L1 through Stop switch contacts 76, conductors 71 and 92, contacts 96, conductors 91 and 88, contacts 112 and 113, the operating coil of relay T to line L2. Relay T is thus energized to close its contacts 23 in each of the secondary resistance networks to shunt main resistor M7 in network RN1 and corresponding main resistors in networks RN2 and RN3 effectively out of circuit. Thus a delayed higher starting torque is afforded motor PM. When relay 1TR subsequently times out to release relay T as hereinbefore described, contacts 23 of the latter reinsert the aforementioned main resistors in the secondary resistance networks. Motor PM then contiues to run in the reverse direction at a slow speed determined by the value of resistance in the secondary resistance networks and the applied load.

To stop the motor the Reverse switch is released to restore relay RCR which in turn restores contactor R to permit motor PM to stop and also reenergizes relay 1TR. Relay 1TR is restored upon opening of knife switch KS in the supply lines.

I claim:

1. In a controller for a motor having a secondary resistance network, a speed selector for preparing commutating circuits for portions of the secondary resistance network to preselect one of a multiplicity of motor operating speeds, said selected commutating circuits being completed following initiation of operation of the motor, control means for initiating operation of the motor, sequentially-operable timing means, means responsive to operation of said control means for operating said timing means to complete said commutating circuits in sequence to control acceleration of the motor to the preselected speed in timed incremental steps, means operable independently of said speed setter for restoring said timing means to control deceleration of the motor to a low speed and for reoperating said timing means to control reacceleration of the motor to the preselceted speed in said timed incremental steps.

2. In a controller for a motor having a secondary resistance network, a speed selector operable to prepare commutating circuits for predetermined portions of the secondary resistance network to preselect one of a multiplicity of motor operating speeds, said selected commutating circuits being completed following initiation of operation of the motor, run control means for initiating operation of the motor, trip speed control means energizable in response to operation of said run control means, sequentially-operable timing means operable to complete said commutating circuits in sequence to control acceleration of the motor to the preselected speed in timed incremental steps when said trip speed control means is energized, means operable independently of said speed selector for selectively restoring said timing means to control deceleration of the motor to a first low speed and for reoperating said timing means to control reacceleration of the motor to said preselected speed in said timed incremental steps, and means operable independently of said speed selector in response to abnormal conditions for restoring said trip speed control means and said timing means to control deceleration of the motor to a second slower speed, the last mentioned means being responsive to termination of said abnormal conditions for reoperating said trip speed control means and said timing means to control reacceleration of the motor to said preselected speed in a greater number of timed incremental steps.

3. In a controller for a motor adapted to drive graphic arts machinery, starting control means for initiating energization of the motor, initial-torque control means, means responsive to operation of said starting control means for energizing the motor and for operating said initial-torque control means to afford a predetermined low torque to take up backlash in the driven machinery, starting-torque control means, and means comprising timing means responsive to operation of said starting control means for operating said starting-torque control means after a predetermined time interval to afford a delayed high motor starting torque.

4. The invention defined in claim 3, wherein said timing means comprises means operable after a second predetermined time interval from the time of initiation of said high starting torque for restoring said starting-torque control means.

5. In a motor controller, in combination, a secondary resistance network connected to the motor secondary winding, a speed selector for partially completing shunting circuits for portions of the secondary resistance network to preselect a desired one of a plurality of different running speeds, starting control means for initiating operation of the motor, acceleration control means responsive to operation of said starting control means for completing said shunting circuits in sequence to control acceleration of the motor to the preselected speed, trip speed control means for restoring said acceleration control means to reduce the motor speed to a predetermined low value, selectively operable means connected to said secondary resistance network for shunting portions thereof to adjust the value of said low speed, and means for controlling stopping of the motor comprising plugging means, means operable to terminate the action of said plugging means, means controlled by the motor secondary current for restraining operation of said terminating means until the motor speed approaches zero value, and means comprising an impedance device for connecting said restraining means to the secondary resistance network whereby effectiveness of said restraining means is essentially unaffected by adjustment of said low speed.

6. The invention defined in claim 5, wherein said terminating means comprises a first winding of a differential relay responsive to said plugging means and operable to terminate the action of said plugging means, and said restraining means comprises a second winding of said differential relay for opposing said first winding, and means comprising a resistor for connecting said second winding for energization in parallel with said secondary resistance network, said second winding being energized by the motor secondary current to maintain said first winding ineffective until the motor speed approaches zero value, and said resistor and parallel connection rendering the energization of said second winding substantially unaffected by adjustment of said low speed.

7. In a motor controller, in combination, means comprising a commutatable secondary resistance network connected to control the secondary current of an induction motor to provide for operation of the motor at different running speeds in one direction, means operable on said secondary resistance network for controlling reduction of the motor speed to a low value, means connected to said secondary resistance network for adjusting the value of said low speed, means for controlling stopping of the motor comprising means for plugging the motor to afford a reverse motor torque, control means connected to said resistance network in response to operation of said plugging means and responsive to said motor running at a speed above a predetermined value for maintaining said plugging means effective and further responsive to said motor speed decreasing below said predetermined value for terminating the action of said plugging means, and means connected between said resistance network and said control means to prevent variation in response of the latter due to adjustment of said low speed.

8. The invention defined in claim 7, together with means responsive to operation of said stopping control means for controlling said secondary resistance network to limit the value of reverse motor torque thereby to reduce the severity of the stopping action.

9. In a motor control system, selective speed control means, acceleration control means, means operable to control starting of the motor, said acceleration control means being responsive to operation of said starting control means to accelerate the motor to a selected speed, a plugging relay having a first winding responsive to starting control of the motor for setting said plugging relay to partially complete a reverse motor torque control circuit, means for controlling stopping of the motor, means responsive to said stopping control means for completing said reverse motor torque control circuit and for restoring said acceleration control means to limit the value of reverse motor torque, a second winding responsive to completion of said reverse motor torque control circuit for resetting said plugging relay to terminate said reverse torque, a third winding opposing said second winding energized in accordance with the motor speed for restraining effectiveness of said second winding until the motor speed approaches zero value, and means connecting said third winding across said speed control means to prevent significant variations in the restraining effectiveness of said third winding due to change in motor secondary frequency.

10. In a controller for a motor having a primary winding and a secondary winding and resistor networks in circuit with said secondary winding, in combination, a switch drum having a zero position and a plurality of operating positions, said drum comprising a plurality of commutating contacts for preparing shunt circuits across certain ones of said secondary resistors in said operating positions to preselect a desired motor speed and a plurality of actuators for selectively operating said contacts, means for actuating said drum to operate said contacts in a predetermined order to preselect a desired speed, means for initiating operation of the motor, timing means responsive to said initiating means for completing said shunt circuits in sequence to accelerate the motor in timed incremental steps, and means operable to cause said timing means to reoperate to reinsert said shunted resistors effectively in circuit with said secondary winding regardless of drum position to reduce the speed of the motor to a predetermined value.

11. The invention defined in claim 10, together with means operable in response to said initiating means for shunting certain ones of said secondary resistors independently of said commutating contacts, and means operable to restore the last mentioned means to cause restoration of said accelerating means thereby to reinsert all said resistors in circuit with said secondary winding to reduce the speed of the motor to a different predetermined value.

12. In a controller for a motor adapted to drive graphic arts machinery, speed control means, means for preselecting a desired one of a multiplicity of motor running speeds, means for controlling starting of the motor, first timing means responsive to said starting control means for controlling said speed control means to provide a delayed high starting torque, means for selectively adjusting the value of said starting torque, said timing means acting after a predetermined time interval upon said speed control means to reduce said starting torque, second timing means responsive to the latter action of said first timing means for operating said speed control means to accelerate the motor in incremental steps to the preselected speed, means operable independently of said preselecting means for controlling said second timing means to decelerate the motor to predetermined lower speeds and thereafter reaccelerate the motor to said preselected running speed, said independently operable means comprising a first control means operable at will to control motor deceleration to a first low speed and second control means automatically operable in response to abnormal conditions for controlling motor deceleration to a different low speed, and means operable upon said speed control means to selectively adjust said different low speed.

13. The invention defined in claim 12, together with means for controlling stopping of the motor, means responsive to said stopping control means for plugging the motor to provide reverse motor torque to enhance the stopping action, said stopping control means restoring said second timing means to limit the reverse motor torque thereby to reduce the severity of the stopping action, said plugging means comprising means operable to deenergize the motor to terminate said reverse motor torque, means for restraining operation of said deenergizing means, and means for connecting said restraining means in parallel with said speed control means to maintain said restraining means effective until the motor speed approaches zero value and to prevent variation in the action of said restraining means as a result of adjustment of said different low speed.

References Cited in the file of this patent

UNITED STATES PATENTS

| | | |
|---|---|---|
| 969,584 | White | Sept. 6, 1910 |
| 1,309,366 | Martensen | July 8, 1919 |
| 2,490,458 | Feldhausen | Dec. 6, 1949 |
| 2,625,672 | Calvert | Jan. 13, 1953 |
| 2,672,579 | Jochem | Mar. 16, 1954 |